United States Patent

Yamada

[11] 4,103,990
[45] Aug. 1, 1978

[54] CATADIOPTRIC WIDE-ANGLE LENS SYSTEM FOR REPRODUCTION

[75] Inventor: Yu Yamada, Kokubunji, Japan

[73] Assignee: Canon Kabushiki Kaisha, Tokyo, Japan

[21] Appl. No.: 739,041

[22] Filed: Nov. 5, 1976

[30] Foreign Application Priority Data

Nov. 7, 1975 [JP] Japan .................. 50-133676

[51] Int. Cl.$^2$ ............................................. G02B 17/08
[52] U.S. Cl. .................................................. 350/199
[58] Field of Search ............... 350/199, 200, 201, 202, 350/27

[56] References Cited

U.S. PATENT DOCUMENTS 2,949,820  8/1960  Becker et al. ........................ 350/199
3,119,892  1/1964  Shenker ............................... 350/199

FOREIGN PATENT DOCUMENTS 2,500,070  7/1975  Fed. Rep. of Germany ........... 350/199

Primary Examiner—Conrad J. Clark
Attorney, Agent, or Firm—Toren, McGeady and Stanger

[57] ABSTRACT

A catadioptric wide-angle lens is disclosed, in which a convex surface of a positive meniscus lens, a convex surface of a negative meniscus lens and a concave surface of a spherical mirror face an object and an image. These elements are arranged in order along the optical axis. The positive meniscus lens is dense crown glass or phosphate dense crown glass. The negative meniscus lens is dense flint glass.

7 Claims, 4 Drawing Figures

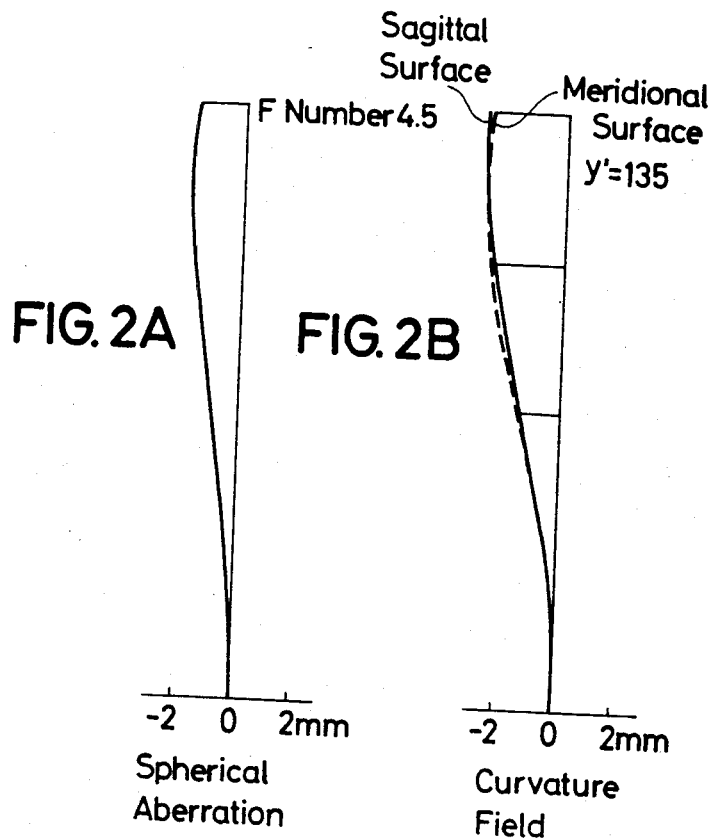
FIG. 2A  Spherical Aberration
FIG. 2B  Curvature Field
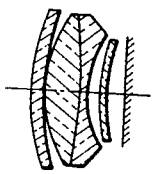
FIG. 3 Prior Art

CATADIOPTRIC WIDE-ANGLE LENS SYSTEM FOR REPRODUCTION

BACKGROUND OF INVENTION

The present invention relates to a lens system for forming an equal or nearly equal magnification image of an object such as one to be photocopied, in particular, a catadioptric lens. Such catadioptric lens is often used as a lens system for photocopying, in which the mirror surface is positioned at the rear portion of the lens components and an image is formed in the front of lens components. For example, a lens system having a simple composition is described in British Pat. No. 983,342. However, a catadioptric lens system for use in photocopy apparatus requires that the F. No. is about 4.5 and the half angle of view is about 24°, so that a lens system having a 3 groups of 4 lens components in front of a plane mirror as shown in FIG. 3 is usually used.

On the other hand, another composition is shown in German Pat. Publication No. 1,797,174, wherein a mangin mirror is positioned behind a positive lens, so that, by this convex mirror, a convergent is given to a light flux from an object with free from the spherical aberration.

Further, as described in U.S. Pat. No. 2,742,817, a uni-magnification lens in which a convex mirror of a smaller radius arranged behind of two biconvex lenses and plano-concave lens may be used.

SUMMARY OF INVENTION

The object of the invention is to provide a wide-angle catadioptric lens system having a small number of lenses, and to provide a composition of a wide-angle catadioptric lens system which can be compensated for the curvature of field and astigmatic difference. For this object, the wide-angle catadioptric lens according to the invention has a composition in which a positive lens, a negative lens and a convex mirror face an object and an image thereof, and are arranged in order along an optical axis.

In the wide-angle catadioptric lens according to the invention, for the material of the negative lens, an optical glass having a high refractive index among many ordinary glasses is used to compensate the spherical aberration of high order, which becomes worse by designing the lens as a wide-angle lens of small curvature of field and astigmate. And, further, in a wide-angle catadioptric lens system according to the invention, a reflecting mirror having a concave mirror surface is used, so as to improve the petzval sum, for the petzval sum becomes worse by using a high index negative lens.

As stated above, in the lens system of the invention, by making the surface of the object and the image space of the negative lens a convex surface, and by making the surface of the reflecting mirror a concave surface, a good compensation of the characters of the image plane, namely curvature of field and astigmatic difference, can be obtained. Further by making the surface of the object and the image space of the positive lens a convex surface, and by making the positive lens a meniscus lens, a good compensation of the aberration of the entire lens system is obtained.

BRIEF DESCRIPTION OF DRAWINGS:

FIG. 2A is a graphic representation of the spherical aberration in example 1.

FIG. 2B is a graphic representation of the curvature of field in example 2.

FIG. 3 is a cross sectional view of a well-known reflection objective lens system.

Figure 1:
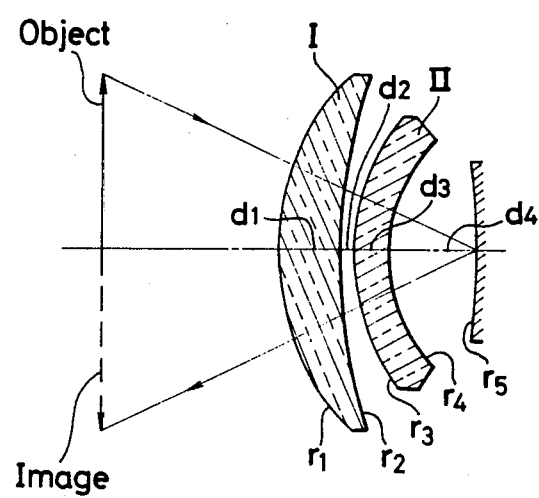
FIG. 1 is a cross sectional view of one embodiment of the present invention.

DESCRIPTION OF PREFERRED EMBODIMENTS:

In FIG. 1, one embodiment according to this invention is shown. A positive meniscus lens with its convex surface in the forward direction, namely the direction of an object and an image, a negative meniscus lens having its convex surface in the forward direction, and a large radius spherical mirror having its concave surface in the forward direction are arranged in order along the optical axis. Assuming, compound focal length is F., the radius of the first surface of said negative meniscus lens is $r_3$, the refractive index of said positive meniscus lens to d-ray is $N_1$ and the dispersion is $V_1$, the refractive index of said negative meniscus lens to d-ray is $N_2$ and dispersion is $V_2$, the lens system shown in FIG. 1 satisfies following conditions;

$0.206F < r_3 < 0.239F$ (1)
$1.56 < N_1 < 1.64$ (2)
$55.0 < V_1 < 63.5$ (3)
$1.75 < N_2 < 1.85$ (4)
$23.0 < V_2 < 28.0$ (5)

The above conditions will be explained below. The condition (1) is to properly maintain curvature of field, so if the value is larger than the upper limit of (1), the curvature of field becomes too large and further it becomes difficult to compensate for spherical aberration of high order. On the other hand, if the value is smaller than the lower limit of (1), though it gives a good effect to the character of image plane, it also provides excessive ring-shaped spherical aberration to compensate spherical aberration, so it is difficult to obtain a lens system of large aperture.

The upper limit of the conditions (2) and (4) are determined by the condition to give a proper compensation for spherical aberration of high order, especially for spherical aberration on meridian plane, on the other hand, if the value is smaller than the lower limit, curvature of field on the meridian plane is becames worse.

The conditions (2) and (4) provide proper compensations to chromatic aberration. According to the hereinafter mentioned example of numerical value, the negative lens is dense flint glass (SF), and the positive lens is dense crown glass (SK) or phosphate dense crown glass (PSK).

The following example of this invention satisfies the above mentioned conditions (1) . . . (5); in the example each symbol represents the following:

$r_1 \ldots r_5$: radius of curvature of each lens
$d_1 \ldots d_4$: thickness of lenses and distance of each lens surface
$N_I, N_{II}$: refractive index of each lens to d-ray
$V_I, V_{II}$: Abbe's number of each lens
hereby F = 154 mm, F. number : 4.5, and half angle of view: 24°.

EXAMPLE 1.

$r_1 = 40.857$  $d_1 = 10.34$  $N_I = 1.60311$  $V_I = 60.7$
$r_2 = 92.276$  $d_2 = 2.51$
$r_3 = 34.968$  $d_3 = 5.31$  $N_{II} = 1.80518$  $V_{II} = 25.4$
$r_4 = 25.772$  $d_4 = 15.33$
$r_5 = -4453.8$ (mirror)

EXAMPLE 2

$r_1 = 43.276$  $d_1 = 10.78$  $N_I = 1.63854$  $V_I = 55.4$
$r_2 = 98.163$  $d_2 = 2.84$
$r_3 = 36.786$  $d_3 = 5.33$  $N_{II} = 1.84666$  $V_{II} = 23.9$
$r_4 = 27.114$  $d_4 = 15.12$
$r_5 = -4664.6$ (mirror)

EXAMPLE 3.

$r_1 = 40.586$  $d_1 = 12.49$  $N_I = 1.6228$  $V_I = 57.0$
$r_2 = 73.518$  $d_2 = 3.03$
$r_3 = 31.768$  $d_3 = 2.79$  $N_{II} = 1.84666$  $V_{II} = 23.9$
$r_4 = 25.674$  $d_4 = 16.96$
$r_5 = -1922.7$ (mirror)

EXAMPLE 4.

$r_1 = 40.084$  $d_1 = 10.64$  $N_I = 1.56873$  $V_I = 63.1$
$r_2 = 89.108$  $d_2 = 1.34$
$r_3 = 34.795$  $d_3 = 5.16$  $N_{II} = 1.76182$  $V_{II} = 26.6$
$r_4 = 25.875$  $d_4 = 16.05$
$r_5 = -2822.9$ (mirror)

As above mentioned, the lens system according to the invention has a composition, which is able to reduce the number of lenses while at the same time keeping a good quality of picture image. As a result, it is difficult to obtain a poor picture image by the mis-alignments of lens system in the electrophotographic apparatus.

What is claimed is:

1. A catadioptric wide-angle lens system for reproduction comprising:
    a positive meniscus lens with its convex surface directed toward an object and an image;
    a negative meniscus lens being arranged axially behind said positive meniscus lens, with its convex surface directed to the object and the image, said negative meniscus lens made of dense flint glass, and satisfying the condition of $0.206F < r_3 < 0.239F$ in which $r_3$ is a radius of curvature of the front lens surface of said negative meniscus lens, wherein F is a focal length of said lens system; and
    a concave mirror arranged axially behind said negative meniscus lens with its concave surface directed to the object and the image; the radius of a curvature of the front surface of said positive meniscus lens being larger than the radius of curvature of the front surface of said negative meniscus lens.

2. A catadioptric wide-angle lens system for reproduction according to claim 1 in which said positive meniscus lens is made of dense crown glass.

3. A catadioptric wide-angle lens system for reproduction according to claim 1 in which said positive meniscus lens is made of phosphate dense crown glass.

4. A lens system for reproduction comprising:
    a positive meniscus lens facing its convex surface ahead direction;
    a negative meniscus lens arranging axially behind said positive meniscus lens and facing its convex surface ahead direction;
    a concave mirror arranging axially behind said negative meniscus lens and facing its concave surface ahead direction; in which radius of a curvature of the front surface of said positive meniscus lens is larger than the radius of curvature of the front surface of said negative meniscus lens, and in which $f = 154$, $f$. number 4.5
$r_1 = 40.857$  $d_1 = 10.34$  $N_I = 1.60311$  $V_I = 60.7$
$r_2 = 92.276$  $d_2 = 2.51$
$r_3 = 34.968$  $d_3 = 5.31$  $N_{II} = 1.80518$  $V_{II} = 25.4$
$r_4 = 25.772$  $d_4 = 15.33$
$r_5 = -14453.8$ $r_1 - r_5$; radius of curvature of each lens surface
$d_1 - d_4$; thickness of lenses or distance of each lens surface
$N_I$, $N_{II}$; refractive index of each lens
$V_I$, $V_{II}$; Abbe's number of each lens.

5. A lens system for reproduction comprising:
    a positive meniscus lens facing its convex surface ahead direction;
    a negative meniscus lens arranging axially behind said positive meniscus lens and facing its convex surface ahead direction;
    a concave mirror arranging axially behind said negative meniscus lens and facing its concave surface ahead direction; in which radius of a curvature of the front surface of said positive meniscus lens is larger than the radius of curvature of the front surface of said negative meniscus lens, and in which $f = 154$, $f$. number 4.5
$r_1 = 43.276$  $d_1 = 10.78$  $N_I = 1.63854$  $V_I = 55.4$
$r_2 = 98.163$  $d_2 = 2.84$
$r_3 = 36.786$  $d_3 = 5.33$  $N_{II} = 1.84666$  $V_{II} = 23.9$
$r_4 = 27.114$  $d_4 = 15.12$
$r_5 = -4664.6$ $r_1 - r_5$; radius of curvature of each lens surface
$d_1 - d_4$; thickness of lenses or distance of each lens surface
$N_I$, $N_{II}$; refractive index of each lens
$V_I$, $V_{II}$; Abbe's number of each lens.

6. A lens system for reproduction comprising:
    a positive meniscus lens facing its convex surface ahead direction;
    a negative meniscus lens arranging axially behind said positive meniscus lens and facing its convex surface ahead direction;
    a concave mirror arranging axially behind said negative meniscus lens and facing its concave surface ahead direction; in which radius of a curvature of the front surface of said positive meniscus lens is larger than the radius of curvature of the front surface of said negative meniscus lens, and in which $f = 154$, $f$. number 4.5
$r_1 = 40.586$  $d_1 = 12.49$  $N_I = 1.6228$  $V_I = 57.0$
$r_2 = 73.518$  $d_2 = 3.03$
$r_3 = 31.768$  $d_3 = 2.79$  $N_{II} = 1.84666$  $V_{II} = 23.9$
$r_4 = 25.674$  $d_4 = 16.96$
$r_5 = -1922.7$ $r_1 - r_5$; radius of curvatute of each lens surface
$d_1 - d_4$; thickness of lenses or distance of each lens surface
$N_I$, $N_{II}$; refractive index of each lens
$V_I$, $V_{II}$; Abbe's number of each lens.

7. A lens system for reproduction comprising:
    a positive meniscus lens facing its convex surface ahead direction;
    a negative meniscus lens arranging axially behind said positive meniscus lens and facing its convex surface ahead direction;
    a concave mirror arranging axially behind said negative meniscus lens and facing its concave surface ahead direction; in which radius of a curvature of the front surface of said positive meniscus lens is larger than the radius of curvature of the front surface of said negative meniscus lens, and in which $f = 154$, $f$. number 4.5
$r_1 = 40.084$  $d_1 = 10.64$  $N_I = 1.56873$  $V_I = 63.1$
$r_2 = 89.108$  $d_2 = 1.34$
$r_3 = 34.795$  $d_3 = 5.16$  $N_{II} = 1.76182$  $V_{II} = 26.6$
$r_4 = 25.875$  $d_4 = 16.05$
$r_5 = -2822.9$
$r_1 - r_5$; radius of curvature of each lens surface
$d_1 - d_4$; thickness of lenses or distance of each lens surface
$N_I$, $N_{II}$; refractive index of each lens
$V_I$, $V_{II}$; Abbe's number of each lens.

* * * * *